(12) United States Patent
Bray

(10) Patent No.: US 11,914,174 B2
(45) Date of Patent: Feb. 27, 2024

(54) VEHICLE SURFACE

(71) Applicant: BAE SYSTEMS plc, London (GB)

(72) Inventor: Mark Edgar Bray, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 12 days.

(21) Appl. No.: 17/753,006

(22) PCT Filed: Aug. 13, 2020

(86) PCT No.: PCT/GB2020/051940
§ 371 (c)(1),
(2) Date: Feb. 15, 2022

(87) PCT Pub. No.: WO2021/032953
PCT Pub. Date: Feb. 25, 2021

(65) Prior Publication Data
US 2022/0326420 A1    Oct. 13, 2022

(30) Foreign Application Priority Data

Aug. 16, 2019 (GB) ...................................... 1911757

(51) Int. Cl.
| | | |
|---|---|---|
| *G02B 5/124* | (2006.01) | |
| *B64D 7/00* | (2006.01) | |
| *F41H 11/00* | (2006.01) | |
| *G02B 5/126* | (2006.01) | |
| *F41H 13/00* | (2006.01) | |

(52) U.S. Cl.
CPC ............... *G02B 5/124* (2013.01); *B64D 7/00* (2013.01); *F41H 11/00* (2013.01); *G02B 5/126* (2013.01); *F41H 13/0056* (2013.01)

(58) Field of Classification Search
CPC ........ G02B 5/124; G02B 5/126; G02B 5/122; G02B 5/136; G02B 5/12; G02B 5/13; G02B 5/132; B64D 7/00; B64D 45/0015; F41H 11/00; F41H 13/0056; F41H 13/0087
USPC ......................................................... 359/857
See application file for complete search history.

(56) References Cited

U.S. PATENT DOCUMENTS

| | | | | |
|---|---|---|---|---|
| 3,986,690 A | * | 10/1976 | Milling ................... | B64D 7/00 244/121 |
| 4,852,452 A | * | 8/1989 | Barry ...................... | F41H 11/00 359/230 |
| 2014/0055858 A1 | * | 2/2014 | Chapman ............... | G02B 1/118 359/530 |

(Continued)

FOREIGN PATENT DOCUMENTS

| | | | | |
|---|---|---|---|---|
| DE | 102013009972 A1 | * | 12/2014 | ............. B42D 25/00 |
| EP | 2463196 A1 | | 6/2012 | |

(Continued)

OTHER PUBLICATIONS

International Preliminary Report on Patentability received for PCT Application No. PCT/GB2020/051940. dated Mar. 3, 2022. 8 pages.

(Continued)

*Primary Examiner* — Jade R Chwasz
*Assistant Examiner* — Jyotsna V Dabbi
(74) *Attorney, Agent, or Firm* — Finch & Maloney PLLC

(57) ABSTRACT

A vehicle surface includes a set of retroreflectors configured to reflect, at least in part, incident hostile light towards a source of the incident hostile light.

19 Claims, 5 Drawing Sheets

(56) References Cited

U.S. PATENT DOCUMENTS

| | | | |
|---|---|---|---|
| 2016/0165707 A1 | 6/2016 | Clemen, Jr. et al. | |
| 2018/0188550 A1* | 7/2018 | Frayne | G02B 30/56 |
| 2020/0141703 A1* | 5/2020 | Bressi | F41H 5/04 |
| 2021/0311227 A1* | 10/2021 | Bray | G02B 1/118 |

FOREIGN PATENT DOCUMENTS

| | | | | |
|---|---|---|---|---|
| EP | 3118564 A1 | | 1/2017 | |
| WO | WO-9936805 A1 | * | 7/1999 | ............ G02B 5/124 |
| WO | 0214777 A1 | | 2/2002 | |
| WO | 2018097840 A1 | | 5/2018 | |
| WO | 2021032953 A1 | | 2/2021 | |

OTHER PUBLICATIONS

International Search Report and Written Opinion received for PCT Application No. PCT/GB2020/051940. dated Oct. 30, 2020. 13 pages.

GB Search Report under Section 17(5) received for GB Application No. 1911757.1, dated Feb. 3, 2020. 3 pages.

\* cited by examiner

S701

S801

VEHICLE SURFACE

FIELD

The present invention relates to a hostile light incident upon vehicle surfaces.

BACKGROUND TO THE INVENTION

Coherent electromagnetic radiation sources, for example lasers, laser lights or laser pointers, particularly visible and/or infra red (IR) lasers, laser lights or laser pointers, may be used maliciously as hostile light to damage assets (also known as articles or devices), for example sensors, control systems, weapons or vehicles. The damage may include disabling or impairing operation, reducing integrity and/or destruction thereof, thereby increasing risk to hostile threats. The damage may be temporary or permanent. The damage may also include harm to humans, for example pilots or drivers, associated with the assets. The harm may include distraction, dazzle, flash blindness and/or physiological or physical damage. Spotlights and/or searchlights may also be used similarly as sources of hostile light.

FIG. 1 is a photograph showing dazzle due to an eye-safe (<1 mW) laser. FIG. 2 is a photograph of the same scene as FIG. 1, under ambient lighting, for comparison. The scene is of a cockpit of an aircraft, looking outwards therefrom. In FIG. 1, the aircraft is targeted by the eye-safe laser.

Hence, there is a need to improve protection of assets from hostile light.

SUMMARY OF THE INVENTION

It is one aim of the present invention, amongst others, to provide a vehicle surface which at least partially obviates or mitigates at least some of the disadvantages of the prior art, whether identified herein or elsewhere. For instance, it is an aim of embodiments of the invention to provide a vehicle surface that reduces a damage to vehicles and/or humans associated with the vehicles due to hostile light incident thereupon. For instance, it is an aim of embodiments of the invention to provide a vehicle surface that retroreflects at least some of the incident hostile back towards a source thereof, so as to affect operation of the source, for example by an operator, and thus cause the hostile light to be no longer incident on the vehicle.

A first aspect provides a vehicle surface, preferably wherein the vehicle is an aircraft, wherein the vehicle surface comprises thereon and/or therein a set of retroreflectors, including a first retroreflector, configured to reflect, at least in part, incident hostile light towards a source thereof.

A second aspect provides a vehicle comprising a vehicle surface according to the first aspect.

A third aspect provides a coating material for coating a vehicle surface, wherein the coating material comprises a set of retroreflectors, including a first retroreflector, configured to reflect, at least in part, incident hostile light towards a source thereof.

A fourth aspect provides a method of providing a vehicle surface, the method comprising: arranging a set of retroreflectors, including a first retroreflector, on a substrate, wherein the set of retroreflectors is configured to reflect, at least in part, incident hostile light towards a source thereof, thereby providing the vehicle surface.

A fifth aspect provides a method of controlling hostile light incident on a vehicle, the method comprising: reflecting, at least in part, the incident hostile light towards a source thereof using a set of retroreflectors, including a first retroreflector, on and/or in a vehicle surface of the vehicle.

A sixth aspect provides use of retroreflectors on a vehicle to counter a source of hostile light incident thereupon.

DETAILED DESCRIPTION OF THE INVENTION

According to the present invention there is provided a vehicle surface, as set forth in the appended claims. Also provided is a vehicle, a coating material for coating a vehicle surface, a method of providing a vehicle surface, a method of controlling hostile light incident on a vehicle and use of retroreflectors on a vehicle to counter a source of hostile light incident thereupon. Other features of the invention will be apparent from the dependent claims, and the description that follows.

Vehicle Surface

The first aspect provides a vehicle surface, preferably wherein the vehicle is an aircraft, wherein the vehicle surface comprises thereon and/or therein a set of retroreflectors, including a first retroreflector, configured to reflect, at least in part, incident hostile light towards a source thereof.

Particularly, by reflecting the incident hostile light towards the source thereof, targeting of the vehicle with the hostile light by an operator, for example a human operator or a non-human operator such as a computer, may be impaired, for example due to reflected distraction, dazzle and/or flash blindness due to reflection of the incident hostile light by the set of retroreflectors. In other words, by distracting, dazzling and/or flash blinding the operator, an accuracy of targeting the vehicle with the hostile light by the operator is diminished, such that a likelihood of further incidence of the hostile light is decreased or prevented. For example, the reflected hostile light may impede a human operator from seeing the vehicle, due to dazzle, and prevent the human operator from targeting the vehicle. For example, the reflected hostile light may be unpleasant for the human operator and deter the human operator from targeting the vehicle. For example, the reflected hostile light may interfere with a sensor and/or a controller of a non-human operator and cause targeting errors. In this way, harm to the human associated with the vehicle is reduced. Advantageously, since at least some to the hostile light is reflected towards the source thereof, dazzle at the source increases with intensity (i.e. brightness) of the hostile light.

In one example, the set of retroreflectors is broadband, such that the set of retroreflectors reflects a broad range of wavelengths of the hostile light and hence are immune to changes in wavelength.

As described above, damage due to hostile light may include harm to humans, for example pilots or drivers, associated with assets (also known as articles or devices), for example sensors, control systems, weapons or vehicles. In the context of the first aspect, the asset is a vehicle and a human associated with the vehicle may be a pilot, a driver, a navigator or a passenger, for example. The harm to the human may include distraction, dazzle (also known as glare or disruption), flash blindness and/or physiological or physical damage.

Distraction, dazzle and flash blindness are visual effects that temporarily distract or block the human's vision. These visual effects are of particular concern when the hostile light is visible light. Furthermore, hostile light sources of visible light, such as laser lights and laser pointers, are readily available.

Typically, laser pointers are sources of electromagnetic radiation having predetermined wavelengths of 445 nm, 532 nm or 650 nm. Some diode sources are sources of electromagnetic radiation having predetermined wavelengths in a range from 1500 nm to 1600 nm. Chemical lasers, such as deuterium fluoride lasers including Mid-Infrared Advanced Chemical Laser, (MIRACL) and Tactical High-Energy Laser (THEL), and AN/SEQ-3 Laser Weapon System (XN-1 LaWS) may be used as directed-energy weapons.

Distraction of a pilot, for example, may occur due to an unexpected laser or bright light during a night time landing or takeoff of an aircraft. The pilot might not know what is happening and may be worried that a brighter light or other threat will follow.

Dazzle (also known as glare and disruption) occurs as an intensity of the hostile light increases, such that the hostile light starts to interfere with the pilot's vision, for example. Veiling glare may make it difficult to see out of a windscreen and/or to view instruments and/or displays in the cockpit. Night vision starts to deteriorate. Laser light, for example, is highly directional, so the pilot may move or shield their eyes in response to avoid the hostile light being in their field of vision.

Flash blindness is similar to exposure to a bright camera flash: there is no injury, but vision is temporarily disrupted. There may be afterimages, leaving temporary spots. Flash blindness is temporary.

Physical damage, though unlikely, may be caused by high intensity visible or invisible (infrared, ultraviolet) laser light, resulting in permanent eye injury. The injury could be relatively minor, such as spots only detectable by medical exam or on the periphery of vision. At higher power levels, the spots may be in the central vision, in the same area where the original light was viewed. Additionally and/or alternatively, the injury may result from incidence of the hostile light proximal a centre of the pilot's vision, for example due to the pilot looking towards the (bright) hostile light such as by reflex, unless trained to avoid such lights. Injury causing a complete and permanent loss of vision is unlikely, but could be caused by high intensity hostile light, deliberately targeted at the vehicle, for example. Damage to the eye is by different mechanisms according to the wavelength, for example UV light tends to be absorbed at the front of the eye and may lead to cataracts, visible and IR light tends to be focused onto the retina where it can burn the cells.

A degree or extent of the harm may depend, at least in part, on an intensity, a beam divergence, a wavelength and/or a pulsing of the hostile light. The greater the intensity (also known as power per unit area), the brighter and more hazardous the hostile light will be. It should be understood that the intensity is the power per unit area and hence beam divergence affects the intensity at the pilot, for example. A lower beam divergence (i.e. a tight beam) of the hostile light will be more hazardous at greater distances. At lower intensities, hostile light outside of the visible spectrum, for example infrared or ultraviolet, does not present visual effects, since it is not visible. However, at higher intensities, such non-visible hostile light can cause physical harm. In some cases, this physical harm may be greater since the human would be unaware of the illumination. However, a sudden bright light is likely to cause the pilot to blink which may mitigate some of the effects such as flash blindness. In general, eyes of pilots in an illuminated night time cockpit are most sensitive to greenish-yellow light (of wavelength around 500-600 nm, peaking at 555 nm). A blue or red laser will appear much dimmer (and thus less distracting notwithstanding the blink reflex) than a green or yellow laser of equal power. For example, a 10-watt continuous-wave yttrium aluminium garnet laser at 532 nm (green) can appear brighter to the eye than an 18-watt continuous-wave argon-ion laser that outputs 10 watts of 514 nm (green-blue) light plus 8 watts of 488 nm (blue) light, though the latter may cause more harm. Some laser lights emit light in pulses. A pulsed laser presents a greater eye damage risk than a continuous laser of equal average power, since an instantaneous intensity of the pulses is greater than an intensity of the continuous laser. In such a case, the blink reflex is too slow to protect the pilot.

For example, a 6-watt green (532 nm) laser having a 1.1 milliradian beam divergence is an eye hazard (i.e. causes physical damage) to about 1,600 feet (about 500 meters), causes flash blindness to about 8,200 feet (about 1.5 miles/ 2.5 km), causes veiling glare to about 36,800 feet (about 7 miles/11 km), and is a distraction to about 368,000 feet (about 70 miles/110 km).

The degree or extent of the harm may additionally and/or alternatively depend, at least in part, on situational factors, such as movement of the hostile light, ambient lighting (for example, dawn, day, dusk or night, sun intensity and/or elevation, cloud coverage and/or atmospheric pollution), movement of the vehicle, distance between the vehicle and the source, relative orientation of the vehicle and the source. If the beam is moving around, for example scanning or rastering the sky, the hostile light traverses a greater region of the sky and thus is more likely to be incident upon an aircraft. However, if the hostile light scans across a cockpit, a duration of incidence upon the aircraft will be relatively short. Generally, concerns regarding hostile light are stronger for night time illumination as the pilot's irises will provide a greater aperture and transmit more laser power. The three visual effects listed above (distraction, glare and flash blindness) are relatively reduced during the day since the eye is not dark adapted. However, harm due to these effects is greater when the eye is dark adapted, such as at night, when the sensitivity of the eye is increased by orders of magnitude. A vehicle moving relatively slowly and/or on a continuous path is at greater risk than a vehicle moving relatively quickly and/or on a discontinuous path. For example, a hovering rotary-winged aircraft may present a relatively stationary target. For example, a fixed-wing aircraft on takeoff and/or landing approach may present a vulnerable target, due to relatively slow speed and/or predictable, continuous path. Reducing a distance between the vehicle and the source increases likelihood of harm. Hence, humans associated with land craft, sea craft and low-flying aircraft may be at greater risk. More closely orienting the source relative to the vehicle increases a likelihood of harm. For example, if the hostile light is targeted from the front directly at an incoming aircraft, a risk of harm to the pilot is relatively higher since a lateral and/or vertical speed of the incoming aircraft relative to the source is relatively low, affording easier targeting, while the pilot is likely to be looking forwards and hence towards the source. Conversely, if the hostile light is targeted across the aircraft, for example from a side thereof, a risk of harm is relatively lower, since a lateral speed of the incoming aircraft relative to the source is relatively high, while the pilot is likely to be looking forwards and hence away from the source.

A determination of dazzle is described in 'Determination of a laser eye dazzle safety framework' Craig A. Williamson, and Leon N. McLin, Journal of Laser Applications 30, 032010 (2018); doi: 10.2351/1.5029384.

Conventional techniques proposed for reducing harm to humans, for example pilots or drivers, associated with vehicles attenuate an intensity of the incident hostile light, by filtering the incident hostile light, such as using goggles worn by the humans or providing windscreen filters in the vehicles. However, these techniques are not considered suitable, practical or recommended for civil air operations, for example. For example, in order to attenuate all possible wavelengths of the incident hostile light, the goggles or windscreen filters must be effectively opaque, while the goggles may be uncomfortable to wear and/or incompatible with light sources, such as displays, in a cockpit.

The first aspect provides the vehicle surface.

In one example the vehicle is an aircraft, such as a fixed wing aircraft or a rotary wing aircraft. In one example, the vehicle is a land craft, such as a car, a lorry or a train. In one example, the vehicle is a water craft, such as a ship, a boat, a hovercraft, a semi-submersible or a submersible. In one example, the vehicle is a military vehicle, for example a military aircraft, such as a military fixed wing aircraft or a military rotary wing aircraft, a military land craft such as a tank or an armoured vehicle, or a military water craft such as a military ship.

The vehicle surface comprises thereon and/or therein the set of retroreflectors, including the first retroreflector, configured to reflect, at least in part, the incident hostile light towards the source thereof.

Generally, a retroreflector (also known as a retroflector, a reflex reflector or a cataphote) is a device or surface that reflects radiation (typically light) back to its source with a minimum of scattering. Particularly, the retroreflector reflects a wavefront of the radiation straight back to the source, at a wide range of angle of incidence. In contrast, a planar mirror reflects the wavefront of the radiation straight back to the source only when the angle of incidence is 90°. Since the reflected radiation from the retroreflector is directed, the reflection is brighter (i.e. more intense) than that of a diffuse reflector.

A coefficient of luminous intensity $R_I$ is the measure of a retroreflector's performance, which is defined as the ratio of the strength of the reflected light (luminous intensity) to the amount of light that falls on the reflector (normal illuminance). A retroreflector appears brighter as its luminous intensity $R_I$ value increases. The luminous intensity $R_I$ of the retroreflector is a function, at least in part, of a colour, a size, and/or a condition thereof. Clear (i.e. optically transparent) or white retroreflectors are the most efficient, and appear brighter than other colours. A surface area of the retroreflector is proportional to the RI value, which increases as the reflective surface increases. Additionally and/or alternatively, the RI is a function of a spatial geometry between an observer (for example an operator of the source i.e. hostile actor), the hostile light source and the retroreflector. The observation angle is the angle formed by the hostile light and the observer's line of sight. The observation angle is a function of the distance between the source and the observer's eyes, and the distance to the retroreflector. As the observation angle increases, the reflector performance decreases. However, the retroreflector appears brightest to the observer when directly in line with the source, such as when the hostile light source is held by a human operator. A brightness of the retroreflector is also a function of the distance between the source and the retroreflector. At a given observation angle, as the distance between the source and the retroreflector decreases, an amount of light incident upon the retroreflector increases. This increases the amount of light returned to the observer and the reflector appears brighter. The amount of light incident upon the retroreflector may additionally and/or alternatively be a function of atmospheric transmission. For example, in fog, retroreflection is relatively low. However, in such cases, relatively low retroreflection also mean low power at the pilot, for example.

In one example, the first retroreflector is clear (i.e. optically transparent) or white.

In one example, the set of retroreflectors is configured to reflect, at least in part, the incident hostile light towards the source thereof by being positioned and/or oriented to reflect, at least in part, the incident hostile light towards the source thereof. In one example, the set of retroreflectors is configured to reflect, at least in part, the incident hostile light towards the source thereof by being positioned on the vehicle in a position having a higher risk of targeting, for example proximal and/or surrounding a windscreen such as proximal and/or surrounding a cockpit of an aircraft, a cabin of a train or lorry or a bridge of a ship and/or an exposed surface of the vehicle in use, for example a front portion of the vehicle and/or an underside such as of an aircraft. In one example, the set of retroreflectors is configured to reflect, at least in part, the incident hostile light towards the source thereof by being oriented on the vehicle so as to reduce an observation angle between the source, the set of retroreflectors and an operator of the source, for example by being oriented radially outwards from the vehicle surface, such as of a front portion of the vehicle and/or downwards, such as relative to an underside such as of an aircraft. In this way, the part of the hostile light reflected towards the source, and hence operator thereof, is increased.

In one example, the first retroreflector comprises and/or is a cube corner, a cat's eye and/or a phase conjugate mirror.

Generally, a cube corner comprises a set of three mutually perpendicular reflective surfaces, placed to form the corner of a cube, work as a retroreflector. The three corresponding normal vectors of the corner's sides form a basis (x, y, z) in which to represent the direction of an arbitrary incoming ray, [a, b, c]. When the ray reflects from the first side, say x, the ray's x-component, a, is reversed to −a, while the y- and z-components are unchanged. Therefore, as the ray reflects first from side x then side y and finally from side z the ray direction goes from [a, b, c] to [−a, b, c] to [−a, −b, c] to [−a, −b, −c] and it leaves the corner with all three components of its direction exactly reversed. Cube corner reflectors occur in two varieties. In the more common first form, the corner is the truncated corner of a cube of transparent material such as conventional optical glass. In this form, the reflection is achieved either by total internal reflection or silvering of the outer cube surfaces. The second form uses mutually perpendicular flat mirrors bracketing an air space. These two forms have similar optical properties. A large relatively thin retroreflector can be formed by combining many small corner reflectors, using the standard hexagonal tiling.

Generally, a cat's eye comprises refracting optical elements with a reflective surface, arranged so that the focal surface of the refractive element coincides with the reflective surface, for example provided by a transparent sphere and (optionally) a spherical mirror, for example a half or partly mirrored sphere. In the paraxial approximation, this effect can be achieved with lowest divergence with a single transparent sphere when the refractive index of the material is exactly one plus the refractive index ni of the medium from which the radiation is incident (ni is around 1 for air). In that case, the sphere surface behaves as a concave spherical mirror with the required curvature for retroreflection. In practice, the optimal index of refraction may be lower than $n_i+1 \cong 2$ due to several factors. For one, it is sometimes preferable to have an imperfect, slightly divergent retroreflection, as in the case of road signs, where the illumination and observation angles are different. This may help for the case where the source and observer are separated. Due to spherical aberration, there also exists a radius from the centerline at which incident rays are focused at the centre of the rear surface of the sphere. Finally, high index materials have higher Fresnel reflection coefficients, so the efficiency of coupling of the light from the ambient into the sphere decreases as the index becomes higher.

However, this may be countered by an anti-reflection coating if the wavelength range of the hostile light is known. Commercial retroreflective beads thus vary in index from around 1.5 (common forms of glass) up to around 1.9 (commonly barium titanate glass). Because the back-side reflection for an uncoated sphere is imperfect, it is fairly common to add a metallic coating to the back half of retroreflective spheres to increase the reflectance, but this implies that the retroreflection only works when the sphere is oriented in a particular direction. An alternative form of the cat's eye retroreflector uses a normal lens focused onto a curved mirror rather than a transparent sphere, though this type is much more limited in the range of incident angles that it retroreflects.

A third way of producing a retroreflector is to use the nonlinear optical phenomenon of phase conjugation. This technique is used in advanced optical systems such as high-power lasers and optical transmission lines. Phase-conjugate mirrors require a comparatively expensive and complex apparatus, as well as large quantities of power (as nonlinear optical processes can be efficient only at high enough intensities). However, phase-conjugate mirrors have an inherently much greater accuracy in the direction of the retroreflection, which in passive elements is limited by the mechanical accuracy of the construction.

In one example, the vehicle surface comprises a paint or lacquer overlaying, at least in part, the set of retroreflectors. In this way, the set of retroreflectors may be protected in use and/or a condition of the set of retroreflectors in and/or on the vehicle surface may be better maintained, for example, reducing and/or preventing degradation due to debris and/or contamination, in use. In this way, drag such as aerodynamic drag due to the set of reflectors may be countered, since the paint or lacquer may physically smooth the vehicle surface while the set of retroreflectors continues to function optically. In this way, a luminous intensity $R_i$ of the set of retroreflectors may be modified by the paint or lacquer.

In one example, the paint or lacquer is provided as a flowable formulation, which is subsequently cured. In one example, the flowable formulation comprises the set of retroreflectors, as described herein. For example, a coating material may be provided as a paint, a lacquer, a varnish or an adhesive that may be applied to the article by brush, by rollering, by spraying and/or by dipping. Such a coating material may be cured, for example by heating and/or by exposure to electromagnetic radiation, and/or dried, for example by evaporation of a solvent. In one example, the flowable formulation, for example after application such as cured or dried, is optically transparent to the incident electromagnetic radiation having the predetermined wavelength. In one example, the flowable formulation, for example after application such as cured or dried, has an optical density of at most 1 (equivalent to 10% of the initially incident electromagnetic radiation), preferably at most 0.1, more preferably at most 0.01. In this way, the electromagnetic radiation may be transmitted through the flowable formulation, for example after application such as cured or dried. Such a coating material may provide a smooth or substantially smooth outer surface on an article. Such a smooth surface may enhance laminar flow of a fluid thereover. Additionally and/or alternatively, such a coating material may provide a non-smooth, for example a roughened, outer surface on an article. Such a non-smooth surface may induce a boundary turbulent layer in a fluid flowing thereover, thereby reducing drag so as to provide an aerodynamic benefit.

In one example, the set of retroreflectors comprises, at least in part, discrete retroreflectors. That is, the discrete retroreflectors are mutually spaced apart i.e. separate. In one example, the set of retroreflectors comprises, at least in part, close-packed retroreflectors. In this way, a proportion of the vehicle surface covered by the set of retroreflectors may be relatively increased. In this way, the part of the hostile light reflected towards the source, and hence operator thereof, is increased. Additionally and/or alternatively, an aspect provides a set of retroreflectors, including a first retroreflector, configured to reflect, at least in part, incident hostile light towards a source thereof, wherein the set of retroreflectors comprises, at least in part, discrete retroreflectors. The set of retroreflectors, the first retroreflector, the incident hostile light and/or the source may be as described with respect to the first aspect.

In one example, the vehicle surface comprises an embossing and/or a film comprising the set of retroreflectors. For example, cube corners may be embossed into the vehicle surface. It should be understood that embossing refers to the relief in the vehicle surface and may be formed by manufacturing methods other than embossing. In this way, the set of retroreflectors may be integrated into manufacture of the vehicle. For example, the set of retroreflectors may be provided in the film (or sheet) and applied to a substrate underlying the film and provided by the vehicle surface. In this way, the set of retroreflectors may be provided on an existing vehicle. The film may be applied to the vehicle, for example by adhesion, through application of heat, chemical reaction and/or mechanical coupling.

In one example, the first retroreflector has a dimension, for example a cube corner length, a cube side, a depth, a width, a diameter, in a range from 5 μm to 100 cm, preferably in a range from 10 μm to 10 cm, more preferably in a range from 50 μm to 1 cm. Additionally and/or alternatively, the dimension may be expressed in terms of wavelengths of the hostile light. For example, the wavelength of the hostile light may be in a range from 100 nm to 2000 nm, preferably in a range from 380 nm to 760 nm for example 445 nm, 532 nm or 650 nm (i.e. visible light) and/or in a range from 700 nm to 1100 nm (i.e. infra red), for example in a range from 760 nm to 1000 nm.

In one example, the set of retroreflectors covers at least 20%, preferably at least 40%, more preferably at least 60% of an area thereof, for example biased towards (i.e. proximal, surrounding) a cockpit and/or a vehicle cabin of the vehicle, such as where a pilot thereof is situated. In this way, the part of the hostile light reflected towards the source, and hence operator thereof, is increased.

Holographic Interference Coating

In one example, the set of retroreflectors comprises an optical interference coating, such as a holographic interference coating (also known as a holographic iridescent film or a holographic interference grating). Holographic interference coatings are known in the art. Generally, a recording medium for the holographic interference coating may comprise a polymeric composition comprising a polymer, for example a photographic emulsion, a dichromated gel, a photoresist, a photothermoplastic, a photopolymer, a photoreactive material (also known as a photosensitive material) and/or a mixture thereof.

Notch Filter

In one example, the set of retroreflectors comprises a filter assembly comprising a first notch filter arranged to attenuate transmission therethrough of electromagnetic radiation having a first wavelength incident normally thereupon.

That is, the first notch filter may reduce transmission therethrough of the electromagnetic radiation having the first wavelength incident normally thereupon. Since the first notch filter is included in the set of retroreflectors, a reduced intensity of the electromagnetic radiation having the first wavelength incident normally thereupon may be incident on the vehicle thereunder, thereby reducing damage thereto.

In one example, the first wavelength is in a range from 100 nm to 2000 nm, preferably in a range from 380 nm to 760 nm for example 445 nm, 532 nm or 650 nm (i.e. visible light) and/or in a range from 700 nm to 1100 nm (i.e. infra red), for example in a range from 760 nm to 1000 nm. Preferably, the first wavelength is in a range from 700 nm to 1100 nm (i.e. infra red), more preferably in a range from 760 nm to 1000 nm.

Typically, laser pointers are sources of electromagnetic radiation having predetermined wavelengths of 445 nm, 532 nm or 650 nm. Some diode sources are sources of electromagnetic radiation having predetermined wavelengths in a range from 1500 nm to 1600 nm. Chemical lasers, such as deuterium fluoride lasers including Mid-Infrared Advanced Chemical Laser, (MIRACL) and Tactical High-Energy Laser (THEL), and AN/SEQ-3 Laser Weapon System (XN-1 LaWS) may be used as directed-energy weapons.

In one example, the first notch filter has a first optical density of at least 1, preferably at least 2, more preferably at least 3. That is, the first notch filter attenuates electromagnetic radiation having the first wavelength incident normally thereupon to at most 10%, at most 1% and at most 0.1% of the incident power, respectively.

In one example, the first notch filter has a bandwidth in a range from 1 nm to 50 nm, preferably in a range from 2 nm to 20 nm, more preferably in a range from 5 nm to 10 nm.

In one example, the first notch filter is arranged to attenuate electromagnetic radiation having a first wavelength range including the first wavelength. That is, the first notch filter reduces transmission therethrough of electromagnetic radiation having a range of wavelengths including the first wavelength, for example a bandwidth around and/or including the first wavelength.

In one example, the first wavelength range is at most 30 nm, preferably at most 20 nm, more preferably at most 10 nm.

In one example, the first notch filter is arranged on the vehicle surface at a first oblique angle thereto, whereby, in use, the first notch filter is at an oblique angle to the incident electromagnetic radiation having the predetermined wavelength.

In contrast with conventional coating materials, the first notch filter of the coating material of the first aspect specularly reflects incident electromagnetic radiation, for example, at an angle away from the source, thereby reducing retro-reflection. This deliberate reflection may reduce damage to the article and/or retro-reflection disclosing the article's location, for example.

Particularly, the first notch filter is arranged to reflect a narrow bandwidth of incident electromagnetic radiation.

The first notch filter may be arranged to have a fixed red shift of the bandwidth, compared to normal incidence, to compensate for a blue shift due to tilting by the first oblique angle.

As described above, in use, the incident electromagnetic radiation having the predetermined wavelength is thus reflected by the first notch filter away therefrom, wherein the first wavelength and the predetermined wavelength are different. Particularly, while the first notch filter is arranged to attenuate transmission of electromagnetic radiation having the first wavelength incident normally thereupon, by including the first notch filter in the coating material on the surface at the first oblique angle, the first notch filter reflects the incident electromagnetic radiation having the predetermined wavelength transmitted due, at least in part, to red shift or blue shift, for example.

Expressing the first oblique angle θ in radians, the wavelength of attenuation, for example blocking, is blue shifted according to Equation 1:

$$\lambda(\theta) = \lambda(0)\sqrt{1 - \left(\frac{\sin(\theta)}{n_{\mathit{eff}}}\right)^2}$$

where $n_{\mathit{eff}}$ is the effective refractive index and $\lambda(0)$ is the first wavelength, incident normally to the first notch filter.

The first notch filter may be arranged at the first oblique angle θ to the optical axis. Therefore, the nominal wavelength needs to be red shifted by a value $\lambda(0)-\lambda(\theta)$ so as to counter the blue shift determined according to Equation 1.

Table 1 shows red shifts calculated from Equation 1 as a function of θ for $\lambda(0)$=532 nm and $n_{\mathit{eff}}$=1.5.

TABLE 1 red shifts calculated from Equation 1 as a function of θ for $\lambda(0)$ = 532 nm and $n_{\mathit{eff}}$ = 1.5.

| θ | Red shift (nm) |
|---|---|
| −80° | 130.7 |
| −70° | 117.3 |
| −60° | 97.6 |
| −50° | 74.6 |
| −40° | 51.3 |
| −30° | 30.4 |
| −20° | 14.0 |
| −10° | 3.6 |
| 0° | 0.0 |
| 10° | 3.6 |
| 20° | 14.0 |
| 30° | 30.4 |
| 40° | 51.3 |
| 50° | 74.6 |
| 60° | 97.6 |
| 70° | 117.3 |
| 80° | 130.7 |

In one example, a difference between the predetermined wavelength and the first wavelength is in a range from 0.1 nm to 150 nm, preferably in a range from 1 nm to 100 nm, more preferably in a range from 10 nm to 50 nm, most preferably in a range from 14 nm to 31 nm. For example, for the most preferred range of 14 nm to 31 nm, reflection of hostile light having the predetermined wavelength is provided for a cone of incidence (i.e. a range of angles of incidence) having a cone angle of approximately 20° to 40°. For some applications, smaller cone angles may be suitable for example in a range from 5° to 30° or less, for example in a range from 5° to 15°.

In one example, the filter assembly comprises a first set of first notch filters, including the first notch filter, arranged to attenuate electromagnetic radiation having respective first wavelengths, including the first wavelength. In this way, detection may be avoided from and/or protection provided from electromagnetic radiation having multiple predetermined wavelengths, for example from lasers having predetermined wavelengths in a range from 700 nm to 1100 nm (i.e. infra red).

In one example, the filter assembly comprises a second notch filter arranged to attenuate electromagnetic radiation having a second wavelength, wherein the first wavelength, the second wavelength and the predetermined wavelength are different. In one example, the filter assembly comprises N notch filters, wherein N is a natural number greater than 1, for example 2, 3, 4, 5, 6 or more, arranged to attenuate electromagnetic radiation having N wavelengths respectively, wherein the N wavelengths and the predetermined wavelength are different In this way, detection may be avoided from and/or protection provided from electromagnetic radiation having multiple predetermined wavelength simultaneously, for example from multiple lasers having predetermined wavelengths in a range from 700 nm to 1100 nm (i.e. infra red).

Antireflective Coating

In one example, an antireflective coating (also known as anti-reflective (AR), anti-reflection (AR) or anti-glare coating) is provided on at least a second part of the surfaces of the set of retroreflectors.

In one example, the antireflective coating is an index-matching coating, a single-layer interference coating, a multi-layer interference coating, an absorbing coating, a moth eye coating or a circular polarizer coating.

Index-matching coatings are the simplest form of anti-reflective coating. For example, a tarnish on a surface of an optical glass replaces an air-glass interface with two interfaces: an air-tarnish interface and a tarnish-glass interface. Since the tarnish has a refractive index between those of glass and air, each of these interfaces exhibits less reflection than the air-glass interface. For example, a graded-index (GRIN) anti-reflective coating has a nearly continuously varying index of refraction, thereby reducing reflection for a broad band of frequencies and incidence angles. Index-matching coatings are cost-effective. By selecting an appropriate thickness of the coating as well as the refractive index thereof, reflected waves (i.e. retroreflected hostile light) may cancel out increasing the transmission.

Single-layer interference coatings include a single thin layer of a transparent material having a refractive index equal or approximately equal to the square root of the underlying substrate's refractive index. In air, such a single-layer interference coating theoretically gives a zero or near zero reflectance for electromagnetic radiation having a wavelength, in the coating, equal to four times a thickness of the coating. Reflectance is also decreased for wavelengths in a broad band around the wavelength. Such a coating having a thickness equal to a quarter of a predetermined wavelength may be known as a quarter-wave layer. In this way, the thickness of the layer may be controlled for the predetermined wavelength. For example, crown glass has a refractive index of about 1.52. An optimal single-layer coating would have a refractive index of 1.23. However, coating materials having such a low refractive index are generally unavailable, although mesoporous silica nanoparticles have refractive indices as low as 1.12. Suitable coating materials include magnesium fluoride $MgF_2$, having a refractive index of 1.38, and fluoropolymers, having refractive indices as low as 1.30, but are more difficult to apply). Coated crown glass, having a coating of $MgF_2$, gives a reflectance of about 1%, compared with 4% for uncoated crown glass. $MgF_2$ coatings are cost-effective and may good anti-reflection over the visible band.

Multi-layer interference coatings typically comprise alternating layers of a lower-index material, for example silica, and a higher-index material, and may provide reflectivities as low as 0.1% at a predetermined wavelength. Multi-layer interference coatings that provide very low reflectivities over a broad range of wavelengths may be prepared, though are relatively complex and/or costly.

Moth eye coatings have protrusions smaller than a predetermined wavelength and are a form of biomimicry. Particularly, surfaces of moths' eyes are covered with a nanostructured film, having a hexagonal pattern of protrusions, each approximately 200 nm high, at 300 nm centres, thereby reducing reflection of visible light. For example, moth eye coatings may be prepared from tungsten oxide and iron oxide, forming tungsten oxide spheroids (~100 s µm diameter) coated with a thin iron-oxide layer (~few nanometers thickness). Black silicon may also be suitable.

In one example, some or all of the retroreflectors of the set of retroreflectors are oriented, for example electrostatically and/or magnetically, whereby the antireflective coating is outermost or generally outermost. In this way, retroreflection of at least some of the hostile light, towards the source (e.g. a laser) thereof, is improved.

Beads

In one example, the set of retroreflectors comprise beads (i.e. cats eyes), for example spheroidal or spherical beads. A surface having an optical interference coating thereon may provided by at least a first part of surfaces of the beads. In other words, the beads may be at least partly coated with the optical interference coating, for example a holographic interference coating and/or wherein the optical interference coating comprises and/or is a filter assembly comprising a first notch filter arranged to attenuate transmission therethrough of electromagnetic radiation having a first wavelength incident normally thereupon. If a rear portion of the beads is metallised, orientation of the set of retroreflectors may be achieved electrostatically.

In one example, the beads are formed from a material transparent to the incident electromagnetic radiation having the predetermined wavelength. In one example, the material has an optical density of at most 1 (equivalent to 10% of the initially incident electromagnetic radiation), preferably at most 0.1, more preferably at most 0.01. In this way, the electromagnetic radiation may be transmitted through the bead. Suitable materials include optical glasses and polymeric materials. Optical glasses include silicate glass, fused quartz glass, soda lime glass, sodium borosilicate glass, lead-oxide glass, aluminosilicate glass, germanium glass and crown glass. Polymeric materials include thermoplastic and/or thermoset polymeric compositions, for example polymethlamethacrylate (PMMA), cellulose acetate butyrate, polycarbonate, glycol modified polyethylene terephthalate, polystyrene (PS), polypropylene (PP), polyethylene (PE), thermoplastic elastomer olefinic (TPO), styrene acrylonitrile (SAN), styrene methyl methacrylate (SMMA), styrene butadiene (SB) copolymer, polyethylene terephthalate (PET), styrene ethylene butylene styrene block copolymer (SEBS), methacrylate butadiene styrene (MBS), polylactic acid (PLA), polyether sulfone (PES) and polysulphone (PSU).

In one example, the beads are completely coated with the optical interference coating, for example a holographic interference coating. In this way, at least some incident electromagnetic radiation reflects off a front surface of a bead while at least some incident electromagnetic radiation is transmitted into the bead (i.e. enters the bead). At least some of the electromagnetic radiation transmitted into the bead is subsequently transmitted out of the bead (i.e. exits the bead). However, at least some of the electromagnetic radiation transmitted into the bead may be trapped in the bead, due to the optical interference coating, for example the holographic interference coating. The trapped electromagnetic radiation may ablate at least a part of the optical interference coating, for example the holographic interference coating, and/or the particle, thereby absorbing energy of the trapped electromagnetic radiation and protecting the underlying article. Furthermore, since the at least a part of the optical interference coating may be ablated, access by the electromagnetic radiation to the remainder of the bead is enabled, providing greater retro reflection and trapping less energy than the intact coating. In other words, the bead is sacrificial, being at least partly damaged by the incident electromagnetic radiation, while protecting the article.

In one example, the beads have a radius in a range from 1 μm to 10 mm, preferably in a range from 10 μm to 1 mm, more preferably in a range from 50 μm to 500 μm, for example 100 μm, 200 μm, 300 μm or 400 μm.

In one example, the beads are provided in a flowable formulation, as described above.

The beads may be prepared as described below.

Vehicle

The second aspect provides a vehicle comprising a vehicle surface according to the first aspect.

The vehicle and/or the vehicle surface may be as described with respect to the first aspect.

In one example, the vehicle comprises and/or is an aircraft.

Method of Providing a Coating Material

The third aspect provides a coating material for coating a vehicle surface, wherein the coating material comprises a set of retroreflectors, including a first retroreflector, configured to reflect, at least in part, incident hostile light towards a source thereof.

The coating material, the vehicle surface, the set of retroreflectors, the first retroreflector, the hostile light and/or the source may be as described with respect to the first and/or second aspects.

Method of Providing a Vehicle Surface

The fourth aspect provides a method of providing a vehicle surface, the method comprising: arranging a set of retroreflectors, including a first retroreflector, on a substrate, wherein the set of retroreflectors is configured to reflect, at least in part, incident hostile light towards a source thereof, thereby providing the vehicle surface.

The vehicle surface, the set of retroreflectors, the first retroreflector, the substrate, the hostile light and/or the source may be as described with respect to the first, second and/or third aspects.

In one example, the method comprises overlaying, at least in part, the set of retroreflectors with a paint or lacquer.

Method of Controlling Hostile Light

The fifth aspect provides a method of controlling hostile light incident on a vehicle, the method comprising:
  reflecting, at least in part, the incident hostile light towards a source thereof using a set of retroreflectors, including a first retroreflector, on and/or in a vehicle surface of the vehicle.

The hostile light, the vehicle, the source, the set of retroreflectors, the first retroreflector, and/or the vehicle surface may be as described with respect to the first, second, third and/or fourth aspects.

In one example, the hostile light has a wavelength in a range from 380 nm to 760 nm.

In one example, the source comprises and/or is a laser and/or wherein the vehicle comprises and/or is an aircraft.

Use

The sixth aspect provides use of retroreflectors on a vehicle to counter a source of hostile light incident thereupon.

The retroreflectors, the vehicle, the source and/or the hostile light may be as described with respect to the first, second, third, fourth and/or fifth aspects.

Identifying and/or Locating Vehicles

The seventh aspect provides use retroreflectors on a vehicle, or other assets, to identify and/or locate the vehicle.

For example, if multiple laser wavelengths are incident on the vehicle and the retroreflection is wavelength selective using a filter (such as a notch filter described herein), the mixture of reflected wavelengths could identify the vehicle e.g. for IFF (Identification Friend or Foe) purposes. Location could be made by scanning a laser across the sky, for example, and identifying a location of a glint to provide the angle to an aircraft. Time of flight measurement of a laser pulse could then be used to measure the range to the aircraft.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
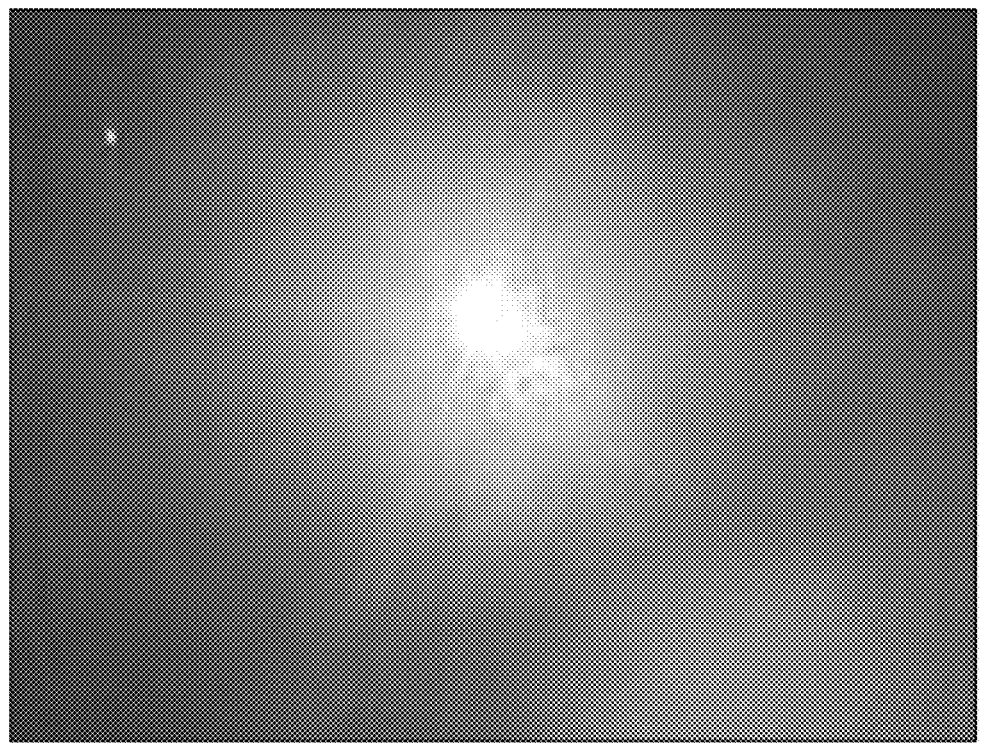
FIG. 1 is a photograph showing dazzle due to an eye safe (<1 mW) laser.
Figure 2:
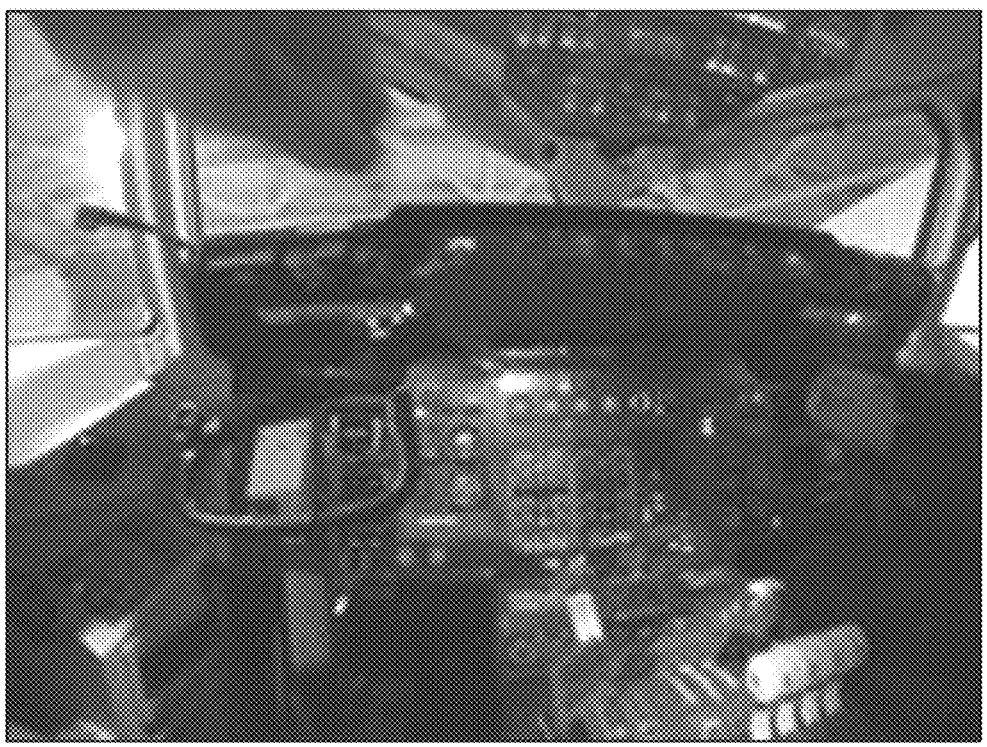
FIG. 2 is a photograph of the same scene as FIG. 1, under ambient lighting, for comparison.
Figure 3:
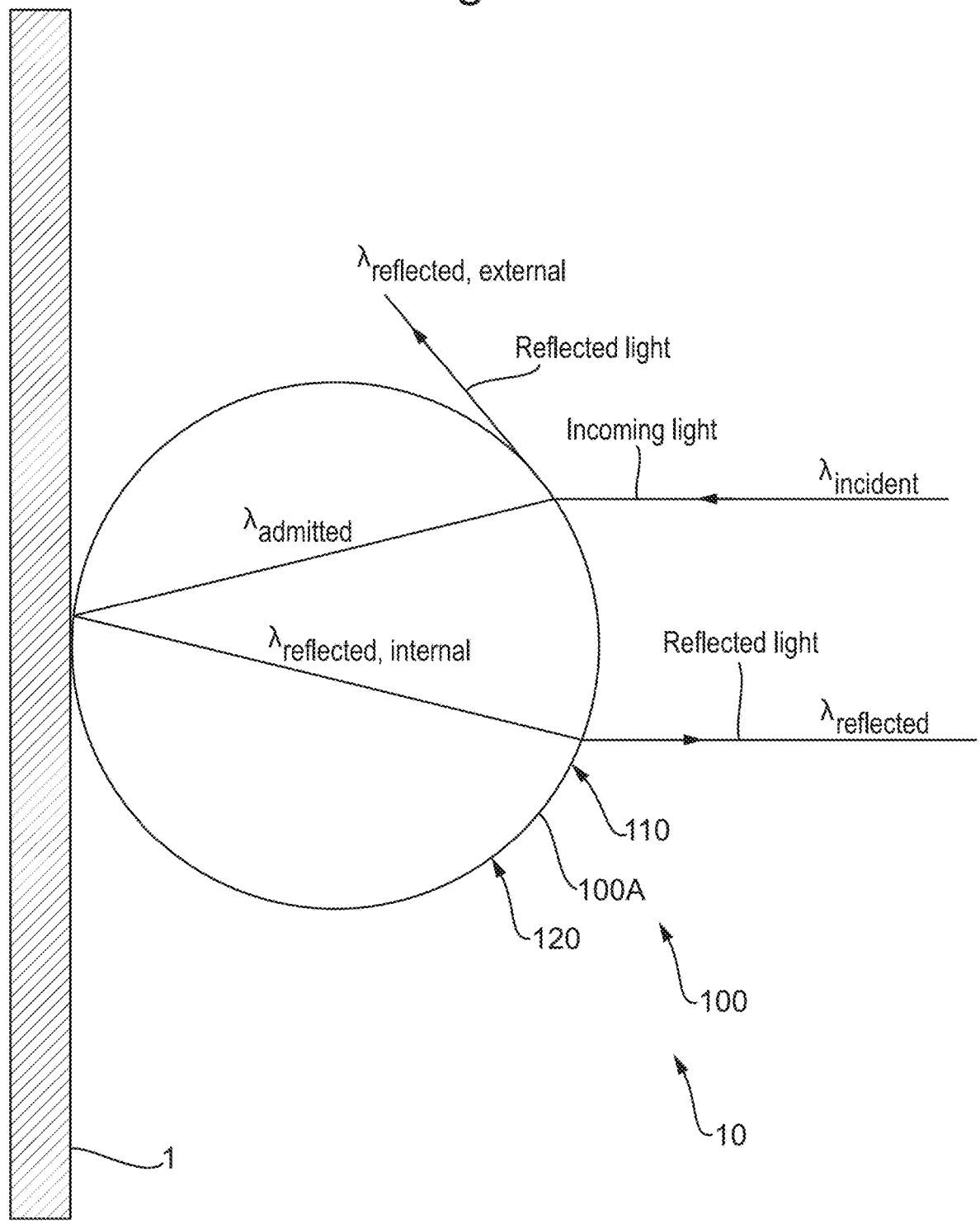
FIG. 3 schematically depicts a vehicle surface according to an exemplary embodiment.

FIG. 3 schematically depicts a vehicle surface 10 according to an exemplary embodiment.

The vehicle surface 10 comprises thereon and/or therein a set of retroreflectors 100, including a first retroreflector 100A, configured to reflect, at least in part, incident hostile light $\lambda_{incident}$ towards a source thereof.

In this example, the first retroreflector 100A is a bead, particularly a spherical bead, provided on a substrate 1. In this example, the first retroreflector 100A is completely coated with an optical interference coating 110, particularly a holographic interference coating 110, provided as a film 120 on a surface of the bead. The particle 130 is formed from optical glass and has a radius of 100 µm. In this example, the set of retroreflectors 100 is coated with a flowable formulation, cured to a solid (not shown).

coating 215 is outermost or generally outermost. In this way, retroreflection of at least some of the incident electromagnetic radiation, towards the source (e.g. a laser) thereof, is improved.

In this way, at least some incident electromagnetic radiation $\lambda_{incident}$ reflects off a front surface of the first retroreflector 100A (i.e. as reflected electromagnetic radiation $\lambda_{reflected, external}$) while at least some incident electromagnetic radiation $\lambda_{incident}$ is transmitted into the first retroreflector 100A (i.e. enters the bead 130 as admitted electromagnetic radiation $\lambda_{admitted}$). At least some of the admitted electromagnetic radiation $\lambda_{admitted}$ transmitted into the first retroreflector 100A is subsequently transmitted out of the first retroreflector 100A (i.e. exits the bead as transmitted electromagnetic radiation $\lambda_{transmitted}$) (not shown). However, at least some of the electromagnetic radiation $\lambda_{admitted}$ transmitted into the first retroreflector 100A is trapped in the bead 130, due to reflection by the optical interference coating, for example the holographic interference coating 110. The trapped electromagnetic radiation $\lambda_{reflected,internal}$ may ablate at least a part of the optical interference coating 110, for example the holographic interference coating, and/or the first retroreflector 100A, thereby absorbing energy of the trapped electromagnetic radiation and protecting the underlying article. At least some of the trapped electromagnetic radiation $\lambda_{reflected,internal}$ may exit the first retroreflector 100A via the front surface i.e. as reflected electromagnetic radiation $\lambda_{reflected}$.

In use, the set of retroreflectors 100 on the vehicle surface 10 is such that the surface of the vehicle is covered in many layers of the beads, thereby providing a protective layer. This allows for the destruction and ablation of the protective layer by the incident hostile light from the source without breach of protection. Protection may be required only for a limited time due to a nature of the source only being able to target the vehicle for a specific time. The holographic interference coating 110 may be tuned for a predetermined wavelength or a range of predetermined wavelengths. Since lasers from sources are generally monochromatic, protection may be thus provided against predetermined sources.

Figure 4:
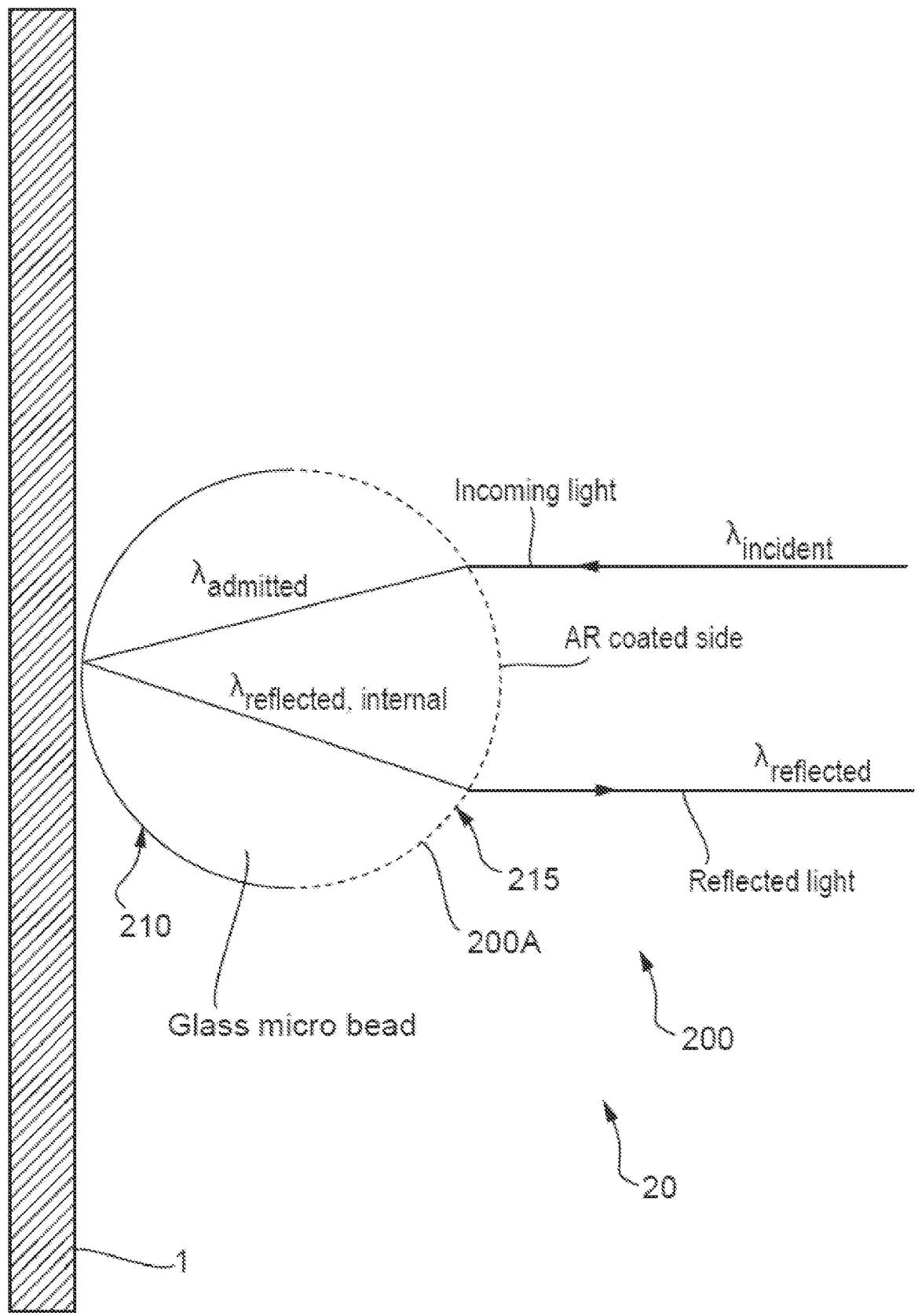
FIG. 4 schematically depicts a vehicle surface according to an exemplary embodiment.

FIG. 4 schematically depicts a vehicle 20 according to an exemplary embodiment. The vehicle surface 20 is similar to the vehicle surface 10 and like features are denoted by like reference signs. However, in contrast to the vehicle surface 10, a holographic interference coating 210 is provided on at least a first part of surfaces of the first retroreflector 200A and an antireflective coating 215 is provided on at least a second part of the surfaces of the first retroreflector 200A. Particularly, half of the surface of the first retroreflector 200A is covered by the holographic interference coating 210 and the other half of the surface of the first retroreflector 200A is covered by the antireflective coating 215. Coating one half of the surface of the first retroreflector 200A with the holographic interference coating 210 allows for greater reflection whilst ensuring that energy is allowed to exit the bead whilst the antireflective coating 215 on the front side allows for easier admittance of the incident hostile light and/or transmittance of the retroreflected light. Preferably, some or all of the retroreflectors of the set of retroflectors 200 are oriented, for example electrostatically, whereby the antireflective coating 215 is outermost or generally outermost. In this way, retroreflection of at least some of the incident electromagnetic radiation, towards the source (e.g. a laser) thereof, is improved.

Figure 5:
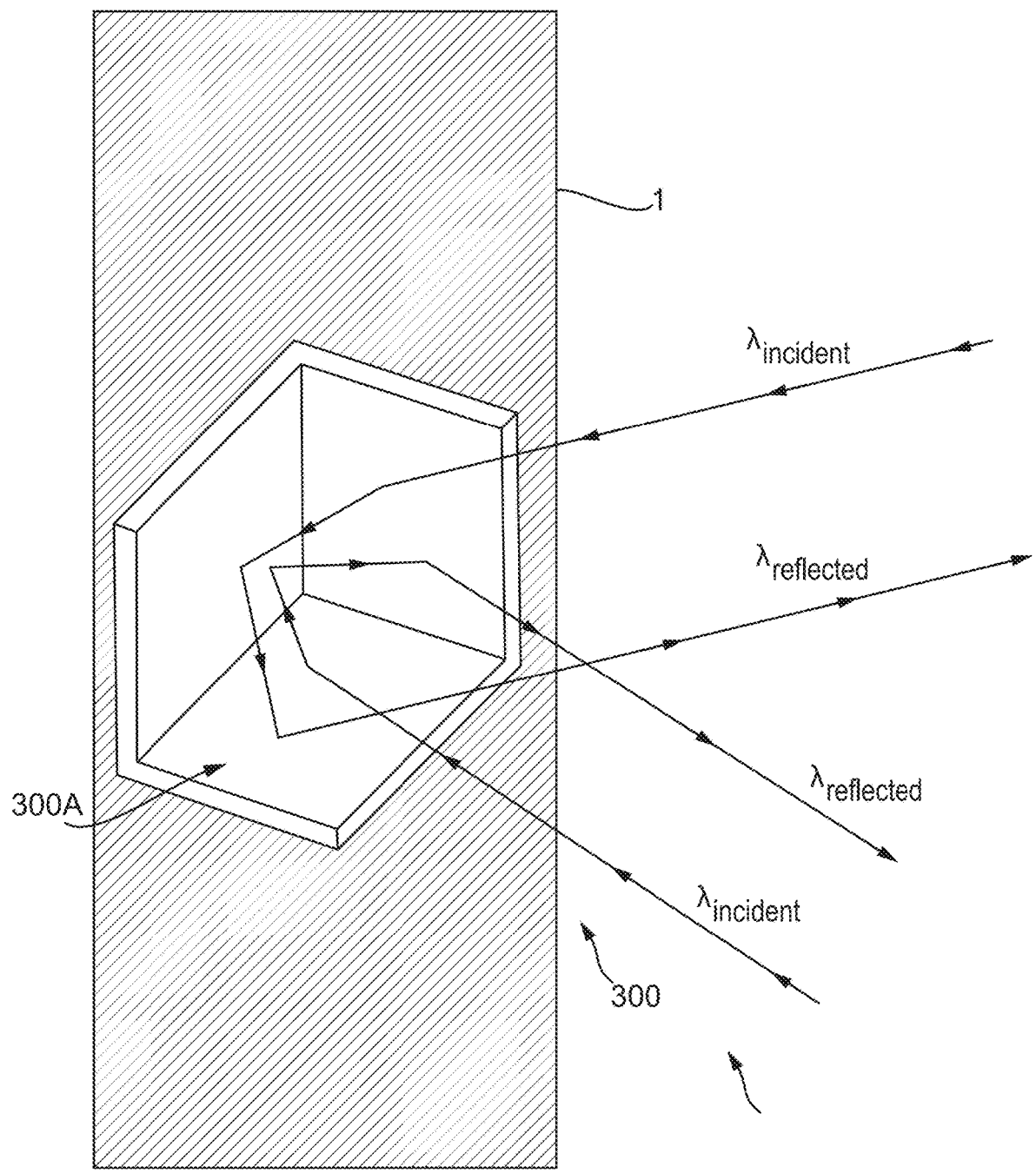
FIG. 5 schematically depicts a vehicle surface according to an exemplary embodiment.

FIG. 5 schematically depicts a vehicle surface 30 according to an exemplary embodiment.

The vehicle surface 30 comprises thereon and/or therein a set of retroreflectors 300, including a first retroreflector 300A, configured to reflect, at least in part, incident hostile light $\lambda_{incident}$ towards a source thereof.

In this example, the first retroreflector 300A is a corner reflector, provided on a substrate 1.

Using a corner reflector arrangement allows for reflection to occur as the internal surfaces may be made from highly polished metal (such as steel), for example with a holographic interference coating applied to the internal surfaces. This would allow for the metallic structure to be cooled using traditional cooling methods such as phase changing, radiators etc. If the laser ablates the holographic interference coating the underlying structure provides additional protection. It is envisaged that many small structures will be placed along the asset to be protected to provide full coverage.

Figures 6, 7, 8:
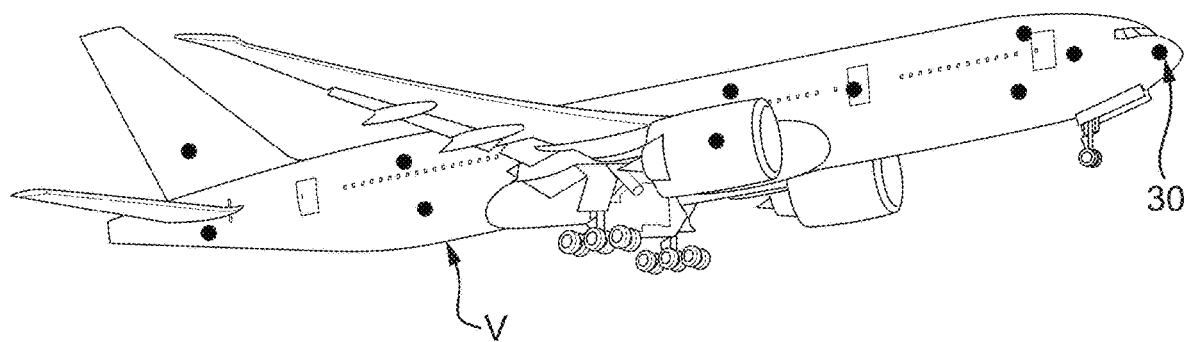
FIG. 6 schematically depicts a vehicle according to an exemplary embodiment.
FIG. 7 schematically depicts a method according to an exemplary embodiment.
FIG. 8 schematically depicts a method according to an exemplary embodiment.

FIG. 6 schematically depicts a vehicle V according to an exemplary embodiment. In this example, the vehicle V is an aircraft including vehicle surfaces 30 (shown as red circles), as described above with reference to FIG. 5.

FIG. 7 schematically depicts a method according to an exemplary embodiment. Particularly, the method is of providing a vehicle surface.

At S701, a set of retroreflectors, including a first retroreflector, is arranged on a substrate, wherein the set of retroreflectors is configured to reflect, at least in part, incident hostile light towards a source thereof, thereby providing the vehicle surface.

Optionally, the method comprises overlaying, at least in part, the set of retroreflectors with a paint or lacquer.

The method may include any of the steps described herein.

FIG. 8 schematically depicts a method according to an exemplary embodiment. Particularly, the method is of controlling hostile light incident on a vehicle.

At S801, the incident hostile light is reflected, at least in part, towards a source thereof using a set of retroreflectors, including a first retroreflector, on and/or in a vehicle surface of the vehicle.

Optionally, the hostile light has a wavelength in a range from 380 nm to 760 nm.

Optionally, the source comprises and/or is a laser and/or wherein the vehicle comprises and/or is an aircraft.

The method may include any of the steps described herein.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A vehicle surface, comprising:
   a retroreflector configured to reflect, at least in part, incident hostile light towards a source of the incident hostile light, the retroreflector configured to be positioned on an outer surface of the vehicle,
   wherein the retroreflector includes a holographic interference coating on at least a first part of a surface of the retroreflector and an antireflective coating on at least a second part of the surface of the retroreflector.

2. The vehicle surface according to claim 1, wherein the retroreflector comprises one or more of a cube corner, a cat's eye, and a phase conjugate minor.

3. The vehicle surface according to claim 1, comprising a paint or lacquer overlaying, at least in part, the retroreflector.

4. The vehicle surface according to claim 1, further comprising a first discrete retroreflector and a second discrete retroreflector.

5. The vehicle surface according to claim 1, comprising one of an embossing and a film comprising the retroreflector.

6. The vehicle surface according to claim 1, wherein the retroreflector has a dimension in a range from 5 µm to 100 cm.

7. The vehicle surface according to claim 1, wherein the retroreflector covers at least 20% of an area of the vehicle surface.

8. A vehicle comprising the vehicle surface according to claim 1.

9. The vehicle according to claim 8, wherein the vehicle is an aircraft.

10. A method of controlling hostile light incident on a vehicle, the method comprising:
    reflecting, at least in part, the incident hostile light towards a source thereof using the vehicle surface according to claim 1, the vehicle surface being part of the vehicle.

11. The method according to claim 10, wherein the hostile light has a wavelength in a range from 380 nm to 760 nm.

12. The method according to claim 10, wherein the source comprises a laser, and wherein the vehicle is an aircraft.

13. The vehicle surface according to claim 1, wherein the retroreflector covers at least 60% of an area of the vehicle surface.

14. The vehicle surface according to claim 1, wherein the retroreflector comprises a spheroidal or spherical bead that is at least partially coated with an optical interference coating.

15. The vehicle surface according to claim 14, wherein the spheroidal or spherical bead includes a metalized surface.

16. The vehicle surface according to claim 1, wherein the retroreflector is at least partially coated with an optical interference coating, the optical interference coating configured to be ablated by at least a portion of electromagnetic radiation of the incident hostile light, thereby absorbing energy from the electromagnetic radiation.

17. A coating material for coating a vehicle surface, the coating material comprising a retroreflector configured to reflect, at least in part, incident hostile light towards a source of the incident hostile light, the retroreflector configured to be positioned on an outer surface of a vehicle, wherein the retroreflector comprises one or more of a cube corner, a cat's eye, and a phase conjugate mirror, and wherein the retroreflector includes a holographic interference coating on at least a first part of a surface of the retroreflector and an antireflective coating on at least a second part of the surface of the retroreflector.

18. A method of providing a vehicle surface, the method comprising:
    arranging a retroreflector on a substrate, wherein the retroreflector is configured to reflect, at least in part, incident hostile light towards a source of the incident hostile light, the retroreflector configured to be positioned on an outer surface of a vehicle, and wherein the retroreflector includes a holographic interference coating on at least a first part of a surface of the retroreflector and an antireflective coating on at least a second part of the surface of the retroreflector.

19. The method according to claim 18, comprising overlaying, at least in part, the retroreflector with a paint or lacquer.

* * * * *

UNITED STATES PATENT AND TRADEMARK OFFICE
CERTIFICATE OF CORRECTION

| | | |
|---|---|---|
| PATENT NO. | : 11,914,174 B2 | |
| APPLICATION NO. | : 17/753006 | |
| DATED | : February 27, 2024 | |
| INVENTOR(S) | : Mark Edgar Bray | |

It is certified that error appears in the above-identified patent and that said Letters Patent is hereby corrected as shown below:

In the Claims

Column 17, Line 54, Claim 2, replace "minor" with --mirror--.

Signed and Sealed this
Twenty-sixth Day of March, 2024

*Katherine Kelly Vidal*

Katherine Kelly Vidal
*Director of the United States Patent and Trademark Office*